March 29, 1955
R. E. KOILE
2,704,942
CHAIN AND SPROCKET ASSEMBLY
Filed March 1, 1954
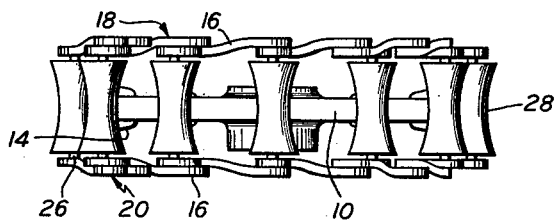
FIG. 1
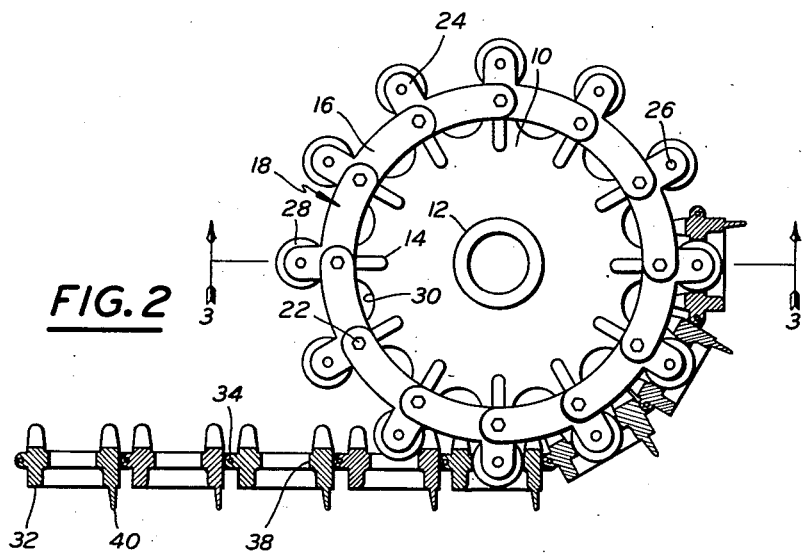
FIG. 2
FIG. 3
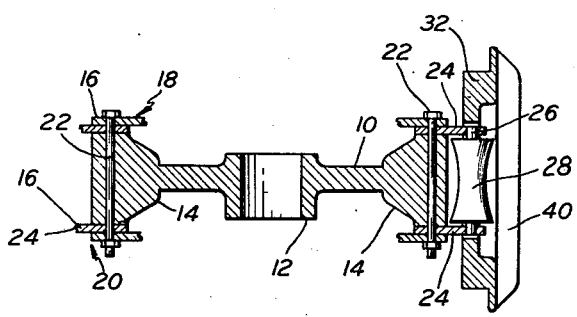
FIG. 4
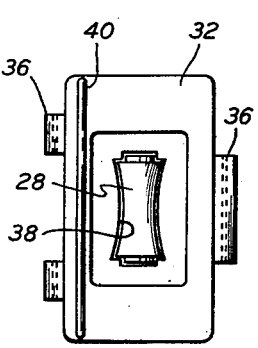
INVENTOR.
ROSS E. KOILE
BY
*Lockwood, Galt, Woodard, & Smith*
ATTORNEYS

United States Patent Office 2,704,942
Patented Mar. 29, 1955

2,704,942

CHAIN AND SPROCKET ASSEMBLY

Ross E. Koile, Churubusco, Ind.

Application March 1, 1954, Serial No. 413,333

5 Claims. (Cl. 74—243)

The present invention relates to a chain and sprocket assembly and more particularly to such an assembly which functions in an improved manner over similar devices of the prior art.

It is an object of this invention to provide a chain and sprocket assembly which is capable of efficient and trouble-free operation in sandy and the like soil when used as the traction mechanism of a conventional crawler tractor.

It is another object of this invention to provide a chain and sprocket assembly which automatically compensates for wear between contacting parts of the chain and sprocket, such compensation being of such a nature as to maintain operating efficiency and reliability.

It is a further object of this invention to provide such an assembly wherein frictional losses between the chain and sprocket are reduced to a minimum.

It is still another object to provide for improved and positive centering of the chain on the sprocket which conduces to a more constant and efficient delivery of power between the assembly parts.

It is still a further object of this invention to provide a chain and sprocket assembly wherein the tendency of the chain to adhere to the sprocket at the point where the two normally part is eliminated.

Other objects will become apparent as the description proceeds.

To the accomplishment of the above and related objects, my invention may be embodied in the form illustrated in the accompanying drawings, attention being called to the fact, however, that the drawings are illustrative only, and that specific change may be made in the specific constructions illustrated and described, so long as the scope of the appended claims is not violated.

In the accompanying drawings:

Fig. 1 is a plan view of one embodiment of this invention;

Fig. 2 is a side elevation of the same embodiment with a partial chain shown in section;

Fig. 3 is a sectional view taken substantially on section line 3—3 of Fig. 2; and Fig. 4 is a plan view of a single chain link in operating engagement with a cooperating part of the sprocket.

Referring to the drawings, the sprocket is comprised of a disc-shaped spider 10 having a centrally located hub 12 adapted to be mounted on an axle or shaft for rotation. A plurality of enlarged portions or bosses 14 are circumferentially spaced around the outer periphery of the spider 10 to serve as supports for the chain-engaging elements. On the various spaced bosses 14 are supported a plurality of annularly arranged arcuate elements or straps 16. These straps are contained in two annular series, indicated by the reference numerals 18 and 20 respectively, and are secured to the axially opposite ends of the bosses 14, as more clearly illustrated in Fig. 3, by means of through bolts 22.

Each strap 16 has a radially outwardly extending roller support 24 for receiving the end of a roller axle or shaft 26. Each shaft 26 carries a roller member 28 which is located in between the two respective supports 24 in such a manner that the axes of all rollers 28 are parallel to the axis of the sprocket 10.

Of importance is the shape of each roller 28 which is substantially cylindrical with the longitudinal extent being convex toward the roller axis. The importance of this particular shape will be explained hereinafter.

The spider 10 is further provided with radially inwardly extending notches 30 disposed between adjacent bosses 14 and extending inwardly a distance sufficient to provide a radial clearance between the inner periphery of the rings 18 and 20 and the spider 10. This radial clearance is clearly illustrated in Fig. 2.

The chain assembly is comprised of a plurality of individual links 32 which are hingedly connected together at 34 by means of suitable mating lugs 36 (Fig. 4). Each link 32 essentially comprises a flat plate having a centrally located opening 38 shaped complementary to the longitudinal configuration of each roller 28. As seen in Fig. 4, the link opening 38 and the roller 28 are complementary, the opening 38 being centered between the opposite lateral sides of the link 32.

In one application of this invention, the chain and sprocket assembly just described is used as the traction mechanism of a crawler tractor, and when so used conventional lugs 40 may be provided on the ground-engaging sides of the respective links 32 to provide increased traction.

In operation, as the chain rolls onto the sprocket, the respective roller 28 and link opening 38 move into registry, and if the roller and link opening should be slightly laterally offset, the convex curvature of the parts will serve to center positively the link on the sprocket.

Since the roller 28 possesses some length, the respective link 32 will automatically be aligned normally to the sprocket plane and will thereby be positioned to provide maximum power transfer between the sprocket and chain.

Each roller 28 is preferably rotatable so that the usual frictional sliding between the conventional sprocket teeth and chain, which produces relatively quick wearing of the sprocket teeth, is completely eliminated.

In due time, the opening 38 as well as the roller 28 will wear, but such wear does not affect the efficiency of operation, since the shapes of the engaging surfaces are retained and the link merely seats farther onto the respective roller. In order to achieve maximum wear life from the assembly, the size of the link opening 38 is made slightly smaller than the diametral size of the roller so that as the opening 38 enlarges, it merely seats farther onto the roller.

In traction mechanisms for crawler tractors, it often happens that sand and dirt become so tightly compacted into the sprocket that the mechanism becomes inoperative. This requires that the compacted material be forcefully removed from the sprocket which, in some cases, is extremely difficult to clear. With this invention, any soil finding its way between the chain and sprocket will simply be forced between the axially spaced straps 16 and out of the radial clearances provided by the notches 30. Thus, the assembly is self-cleaning and improves the reliability of tractor operation.

With reference to Fig. 2, assuming the sprocket to be rotating in a clockwise direction, the chain will not adhere to the sprocket and tend to rotate with it at the bottom thereof but merely falls away from the respective rollers by virtue of rotation of the latter. In conventional chain and sprocket arrangements, the chain tends to adhere to the sprocket at the point of separation therebetween.

What is claimed is:

1. A rotary power-transmitting mechanism comprising a chain and sprocket assembly wherein the sprocket includes a disc-shaped spider having a hub portion and a plurality of circumferentially arranged roller members, the axes of said roller members being mutually parallel and parallel to the axis of said spider, said spider having radially inwardly extending notches between adjacent roller members whereby dirt material is prevented from compacting between roller members; and said chain including a plurality of hingedly connected links adapted for engagement with respective ones of said roller members, each link having an opening corresponding to the shape of the respective roller member for effecting the aforementioned engagement for providing a driving connection between said chain and said sprocket.

2. A rotary power-transmitting mechanism comprising a chain and sprocket assembly wherein the sprocket includes a disc-shaped spider having a hub portion and a plurality of circumferentially arranged roller members, the axes of said roller members being mutually parallel and parallel to the axis of said spider, said spider having radially inwardly extending notches between adjacent roller members whereby dirt material is prevented from compacting between roller members; a plurality of arcuate supporting elements annularly mounted on the outer periphery of said spider, said elements rotatably carrying said roller members; and said chain including a plurality of hingedly connected links adapted for engagement with respective ones of said roller members, each link having an opening corresponding to the shape of the respective roller member for effecting the aforementioned engagement for providing a driving connection between said chain and said sprocket.

3. A rotary power-transmitting mechanism comprising a chain and sprocket assembly wherein the sprocket includes a disc-shaped spider having a hub portion and a plurality of circumferentially arranged roller members, the axes of said roller members being mutually parallel and parallel to the axis of said spider, said spider having radially inwardly extending notches between adjacent roller members whereby dirt material is prevented from compacting between roller members, a plurality of circumferentially arranged mounting bosses provided on said spider, and a plurality of arcuate supporting elements annularly arranged on the outer periphery of said spider and supported by respective ones of said bosses, there being two axially spaced series of said arcuate elements on respective opposite sides of said bosses, axially opposite pairs of said arcuate elements rotatably carrying respective roller members therebetween; and said chain including a plurality of hingedly connected links adapted for engagement with respective ones of said roller members, each link having an opening corresponding to the shape of the respective roller member for effecting the aforementioned engagement for providing a driving connection between said chain and said sprocket.

4. A rotary power-transmitting mechanism comprising a chain and sprocket assembly wherein the sprocket includes a disc-shaped spider having a hub portion and a plurality of circumferentially arranged roller members, the axes of said roller members being mutually parallel and parallel to the axis of said spider, said spider having radially inwardly extending notches between adjacent roller members whereby dirt material is prevented from compacting between roller members, a plurality of circumferentially arranged mounting bosses provided on said spider, and a plurality of arcuate supporting elements annularly arranged on the outer periphery of said spider and supported by respective ones of said bosses, there being two axially spaced series of said arcuate elements on respective opposite sides of said bosses, axially opposite pairs of said arcuate elements rotatably carrying respective roller members therebetween, said roller members each being substantially cylindrical in shape but with the longitudinal extent thereof convex toward the axis; and said chain including a plurality of hingedly connected links adapted for engagement with respective ones of said roller members, each link having an opening corresponding to the shape of the respective roller member for effecting the aforementioned engagement for providing a driving connection between said chain and said sprocket.

5. A rotary power-transmitting mechanism comprising a sprocket assembly wherein the sprocket includes a disc-shaped spider having a hub portion and a plurality of circumferentially arranged roller members, the axes of said roller members being mutually parallel and parallel to the axis of said spider, said spider having radially inwardly extending notches between adjacent roller members whereby dirt material is prevented from compacting between roller members, a plurality of circumferentially arranged mounting bosses provided on said spider, and a plurality of arcuate supporting elements annularly arranged on the outer periphery of said spider and supported by respective ones of said bosses, there being two axially spaced series of said arcuate elements on respective opposite sides of said bosses, axially opposite pairs of said arcuate elements rotatably carrying respective roller members therebetween, said roller members each being substantially cylindrical in shape but with the longitudinal extent thereof convex toward the axis.

References Cited in the file of this patent

UNITED STATES PATENTS

| 511,012 | Godbery | Dec. 19, 1893 |
| 2,353,122 | Bigley, Jr. | July 11, 1944 |

FOREIGN PATENTS

| 6,002 | Great Britain | 1896 A. D. |